April 20, 1937.  F. J. HOOKER ET AL  2,078,197

FIREPROOF FILTERING MATERIAL

Filed Jan. 15, 1935

INVENTORS
Frederick J. Hooker
BY James R. Carruthers
Wood + Wood   ATTORNEYS

Patented Apr. 20, 1937

2,078,197

UNITED STATES PATENT OFFICE 2,078,197

FIREPROOF FILTERING MATERIAL

Frederick J. Hooker, Cincinnati, and James R. Carruthers, Glendale, Ohio, assignors to The Stearns & Foster Company, Lockland, Ohio, a corporation of Ohio Application January 15, 1935, Serial No. 1,934

5 Claims. (Cl. 252—2.5)

This invention relates to a fire-proof filtering material adapted particularly to filter air in air conditioning systems. The invention likewise relates to a preferred method of constituting this material.

Many types of filter have been used in air conditioning systems with varying degrees of success. It is desirable that the filtering material employed be relatively inexpensive so that it may be replaced from time to time, that it be easy to handle so that less than expert workmanship is required either for installation or replacement, and that its consistency be such that it removes even the finest dirt or soot particles from the atmosphere without impeding too greatly the air flow. Inasmuch as the filter in an air conditioning system is usually connected with a plurality of rooms by conduits, and inasmuch as a forced draft is maintained through the conduit system, it is highly desirable that the filtering material be fire proof or at least sufficiently so not to actively blaze.

The object of this invention is to provide a filtering material possessing the properties previously specified as desirable in a material of this type.

Another object of the invention is to provide a method or process of constituting such material.

Other objects and further advantages will appear in the description of the accompanying drawing, in which.

A membrane suitable for service as a filter in an air conditioning system requires sufficient physical stability to withstand passage of the current of air, together with a permeability which is neither too great nor too small. The required permeability tends to be inconsistent with the required physical stability. The problem is to proportion these two properties in constituting the filtering membrane so that it may be employed successfully in commercial air conditioning systems of the type at present in use.

The filtering material of this invention comprises a sheet of carded cotton fibers, the outer surface fibers on each side of the sheet being adhesively united sufficiently to give the sheet a structural stability, but the adhesive or sizing used to unite the outer surface fibers being applied so that the porosity and permeability of the sheet is not materially diminished with respect to the passage of air current.

Figure 1:
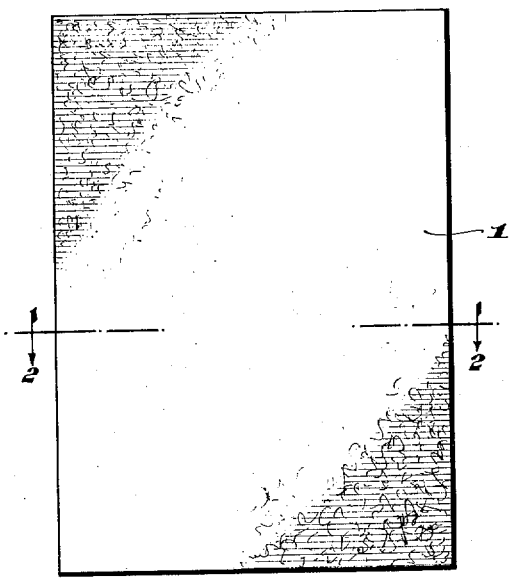
Figure 1 is a plan view of the filtering material of this invention.
Figure 2:
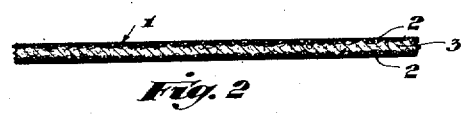
Figure 2 is an enlarged sectional view on line 2—2, Figure 1.
Figure 3:
Figure 3 is an enlarged sectional view similar to Figure 2 but showing a membrane having only one side thereof adhesively strengthened.

Referring to the drawing, the membrane is generally indicated by 1. Figure 2 shows a skin 2—2 applied on either side of a loosely knit, carded fiber cover 3 of relatively greater porosity, but having high dirt collective qualities. In Figure 3 the skin 2 is applied to only one side of the carded fiber sheet 3.

The cotton fibers are impregnated with a material adapted to reduce their inflammability. This impregnation of the fibers, in contra distinction to a fiber surface coating, accomplishes the desired fire-proofing objective without detracting from the felting property of the fibers or their dirt or dust collecting characteristics.

A preferred method of constituting the filter membrane of this invention is as follows. Cotton fibers, dewaxed and preferably bleached, are soaked in a fire-proofing solution so that they become impregnated preferably throughout with a fire-proofing material. The term "fire-proofing material" is used to comprehend materials which materially reduce the tendency of cotton fiber to burn with a flame, and is not intended to designate solely materials which render the fiber indestructible by heat. One solution suitable for fire-proofing the cotton fibers comprises: 4% borax, 4% boric acid, 8% diammonium acid phosphate, all dissolved in water. The percentages of the specified ingredients are all based on the weight of the water of the solution.

The percentages of the ingredients specified above are not critical but in general the greater amount of fire-proofing ingredients in the solution results in greater fire-proofing, for instance, the diammonium acid phosphate disclosed above may vary from 4 to 20%. As examples, the following other types of fire-proofing solutions are disclosed:

Example 1

|  | Percent |
| --- | --- |
| Ammonium chloride | 6 |
| Calcium chloride | 6 |

Example 2

|  | Percent |
| --- | --- |
| Calcium chloride | 4 |
| Ammonium chloride | 4 |
| Ammonium sulphate | 4 |

Generally speaking, the preferred ingredients of the fire-proofing solution when incorporated into the fiber have the chemical action of producing a non-combustible gas when the fibers are subject to heat. It is desired that the ingredients used for fire-proofing have the capacity to produce a comparatively large amount of gas when the impregnated fibers are subjected to a relatively low temperature otherwise sufficient to cause ignition of untreated fibers.

Preferably, the cotton fibers are dry when being put in this solution as the dry fibers absorb the solution more readily than fibers which are already of high moisture content. Complete immersion of the fibers in a solution of this nature for a period of two to ten minutes is sufficient for impregnation.

After impregnation and fire-proofing of the fibers, the fibers are then dried and carded into a sheet of requisite thickness. One such sheet susceptible to use as a filtering membrane is of such thickness that the sheet weighs .8 ounce per square yard. The sheet may, however, be made thinner or thicker, depending upon the type of filtering equipment in which the membrane is to be used, the pressure and velocity of the air to be passed therethrough, and the nature of contamination of the air being filtered. In general, the method of constituting the sheet from the carded, impregnated, non-inflammable fibers, is similar to that described as the old or customary method in Loomis Patent No. 1,928,568. The sheet after carding to the requisite weight is compressed to the desired thickness and is treated with a surface sizing adapted to act as an adhesive for uniting the surface webs into a lace-like or lattice structure.

Though many types of adhesive may be successfully employed, a dilute sizing solution such as one-half to three percent approximately of animal glue in water, or a dilute starch solution, may be used. This solution may be applied to the sheet by spraying or brushing or passing the sheet through rolls in such a manner and in such quantity that the size or adhesive when applied to the sheet unites the fibers structurally into a discontinuous coating or porous skin but does not objectionably impair membrane permeability.

This membrane when so constituted is characterized by a core of loosely knit and united cotton fibers and a surface lattice on one or both sides of the core of relatively great structural stability as compared to the core, but having a porosity or air permeability enabling the sheet to be used as a filter without great increase in pressure loss of air flowing therethrough. If desired, a membrane may be constituted according to the foregoing description and split into halves as disclosed in Figure 3, each of the halves being adapted for use as separate filtering membranes.

The membrane of our invention may then be folded upon itself or rolled upon itself to facilitate packing and shipment and at the time of use spread out in membrane form without contiguous layers adhering to each other. In use, this material is possessed of the structural stability to withstand the air current pressures now commonly used in air conditioning systems. The permeability of the materials is such that it removes the dust, soot, dirt and contamination from the air without developing objectionable back pressure. This material is relatively inexpensive and may be changed at frequent intervals.

The fibers, due to preservation of their felting quality in the fire-proofing treatment, are appropriately related to constitute a strong membrane which is possessed of great dirt collecting capacity without impairment of permeability. The non-inflammable or fire-proof nature of the composition permits the utilization of a product of this type with its attendant advantages, whereas otherwise such a filtering material might constitute a very objectionable fire hazard.

Having described our invention, we desire to be limited only by the ensuing claims:

1. In an air filter, a filtering membrane adapted for air conditioning, said membrane, comprising, a thin layer of carded cotton fibers impregnated with a material adapted to reduce their inflammability, said layer surfaced with a discontinuous coating of adhesive adapted to hold said carded fibers together structurally without materially impairing the permeability of the layer.

2. In an air conditioning system, a filter membrane, said membrane comprising, cotton fibers impregnated with non-inflammable solids, said fibers carded into a thin sheet and covered on each side with a discontinuous adhesive coating adapted to impart to the membrane the structural stability requisite for withstanding the passage of air without materially decreasing its permeability.

3. A non-inflammable filtering membrane in an air conditioning system comprising, a sheet of carded cotton fibers surfaced with a skin of cotton fibers adhesively united into a lattice structure of relatively high air permeability, said carded cotton fiber containing boric acid, borax, and diammonium acid phosphate.

4. A filtering membrane for use in an air conditioning system, said membrane comprising, a sheet of carded cotton fibers of requisite thickness covered on each side by a porous skin of cotton fibers flexibly adhesively united to form a lattice structure possessed of structural stability as compared to the carded cotton sheet, said carded cotton fiber homogeneously impregnated with inorganic chemicals adapted to evolve a non-combustible gas when said sheet is heated to a temperature corresponding to the ignition temperature of cotton fiber.

5. A non-inflammable filtering membrane for use in air conditioning systems comprising, a sheet of carded cotton fibers surfaced with a skin of cotton fibers adhesively united into a lattice structure of relatively high air permeability, said carded cotton fiber containing at least 4% boric acid, at least 4% borax, and from 4 to 20% diammonium acid phosphate.

FREDERICK J. HOOKER.
JAMES R. CARRUTHERS.